United States Patent Office 3,659,013
Patented Apr. 25, 1972

3,659,013
METHOD OF INDUCING ANALGESIA WITH DIALKYLACETYLANILIDES
Henry E. Meunier, 24 Avenue Alsace Lorraine, Grenoble, France, and Pierre L. Eymard, 22 Avenue de la Liberte, Fontaine, France
No Drawing. Continuation-in-part of application Ser. No. 673,260, Oct. 6, 1967. This application Sept. 11, 1970, Ser. No. 71,368
Claims priority, application France, Oct. 21, 1966, 81,021
Int. Cl. A61k 27/00
U.S. Cl. 424—324
10 Claims

ABSTRACT OF THE DISCLOSURE

Dialkylacetyl benzenes, naphthalenes and anilides; and derivatives thereof are disclosed as analgesic, antipyretic and anti-inflammatory agents.

CROSS-REFERENCE TO RELATED APPLICATION

This application is a continuation-in-part of our co-pending application Ser. No. 673,260 filed Oct. 6, 1967 now abandoned.

An object of the present invention are new medicaments, notably analgesic, antipyretic and anti-inflammatory medicaments, which are derivatives corresponding to the general formula below:

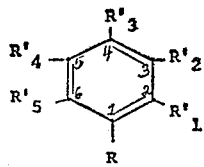

in which R represents: either an amino group substituted by a dipropylacetyl radical and corresponding to the formula $-NH-CO-CH(C_3H_7)_2$; or an hydroxyl radical substituted by a dipropylacetyl radical and corresponding to the formula $-O-CO-CH(C_3H_7)_2$; and in which $R'_1$, $R'_2$, $R'_3$, $R'_4$, $R'_5$ represent simultaneously or separately:
(a) in the case where R is a substituted amino group: either an atom of hydrogen, or a simple hydroxyl radical or substituted by, in particular, a methyl, ethyl, butyl, propyl, dipropyl or other group; or a halogen atom (Cl, Br, I, F) or a $NO_2$ group; or a halomethyl group such as $CCl_3$, $CBr_3$, $CF_3$, $CI_3$; or a methyl, ethyl, butyl, propyl or other group; or an amino group or the corresponding amides. (b) in the case where R is a substituted hydroxyl group: either a hydrogen atom in the case of $R'_2$, $R'_3$, $R'_4$ and $R'_5$; and in the case of $R'_1$, a CO—R'' group in which R'' can be for example: a hydroxyl group; a halogen such as chlorine, bromine, iodine; a simple alkyl radical such as, for example: methyl, ethyl, propyl, butyl and the corresponding isomers as well as their higher homologues; a simple amide; a substituted amide such as N-monoacetyl amide, N-monoethoxy amide, N-monodipropylacetyl amide, homogeneous or mixed disubstituted amides; or, an atom of hydrogen in the case of $R'_2$ and $R'_3$, a CO—R'' group, as above, in the case of $R'_1$, and an aromatic group in the case of $R'_4$ and $R'_5$ taken together. This latter possibility concerns, in particular, dipropylacetylhydroxynaphthoic acid, substituted or not.

More specifically, this invention relates to a method of inducing analgesia and reducing temperature or inflammation in warm-blooded animals in which it is desired to induce such conditions, comprising administering to said animals in an amount sufficient to induce said analgesia and reduce temperature or inflammation, a compound of the formula

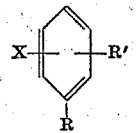

wherein R is selected from the group consisting of dipropylacetylamino and dipropylacetyloxy, wherein the instance R is dipropylacetylamino R' is selected independently from the group consisting of hydroxy, lower alkoxy, halomethyl and acetamido and X is selected from the group consisting of hydrogen and halogen, and where in the instance R is dipropylacetyloxy R' is CO—R'' wherein R'' is selected independently from the group consisting of hydroxyl and amido and X is hydrogen.

The present invention envisions notably:
(1) dipropylacetylsalicylic acid of the following formula:

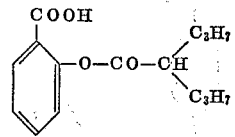

designated hereafter by the abbreviation: B.34.65.
(2) dipropylacetylsalicylamide of the following formula:

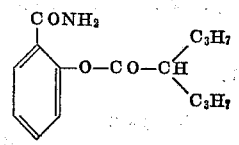

designated hereafter by the abbreviation: B.G.12P.F.
(3) dipropylacetyl-ethoxy-4-anilide of formula:

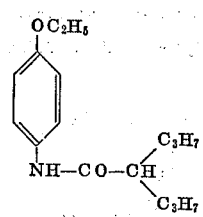

designated hereafter by the abbreviation: B.G.11G.A.
(4) dipropylacetyl-hydroxy-4-anilide of formula:

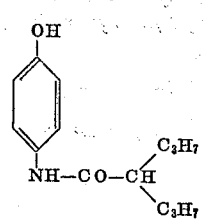

designated hereafter by the abbreviation: B.G.11G.B.
(5) dipropylacetyl-acetamide-4-anilide of formula:

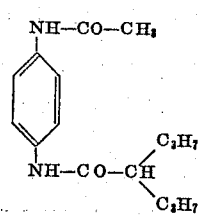

designated hereafter by the abbreviation: B.G.11M.V.

(6) dipropylacetyl-trifluoromethyl-2-anilide of formula:

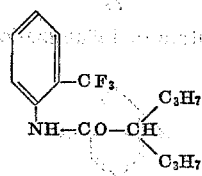

designated hereafter by the abbreviation: B.G.11J.E.

(7) dipropylacetyl - trifluoromethyl - 3 - anilide of formula:

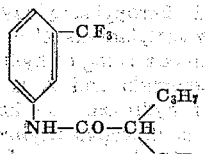

designated hereafter by the abbreviation: B.G.11J.F.

(8) dipropylacetyl - trifluoromethyl - 4 - anilide of formula:

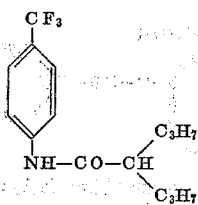

designated hereafter by the abbreviation: B.G.11J.G.

(9) dipropylacetyl-trifluoromethyl - 5 - chloro-2-anilide of formula:

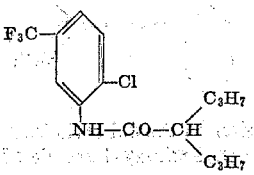

designated hereafter by the abbreviation: B.G.11J.H.

(10) dipropylacetyl - bis-trifluoromethyl-3-5-anilide of formula:

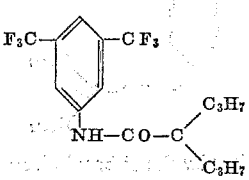

designated hereafter by the abbreviation: B.G.11J.I.

(11) dipropylacetylhydroxynaphthoic acid of formula:

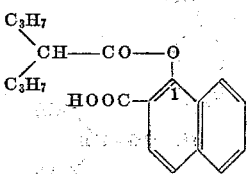

designated hereafter by the abbreviation: B.G.12P.B.

PHYSICAL CHARACTERISTICS

These products most generally occur in the form of a crystalline powder, generally white, sometimes beige pink,

PROCEDURE FOR PREPARATION

By way of example a brief procedure will be given for the preparation of dipropylacetylsalicylic acid, a procedure for the preparation of dipropylacetyl-hydroxy-4-anilide, as well as a procedure for the preparation of dipropylacetyltrifluoromethyl-5-chloro-2-anilide. The other derivatives can be obtained in analogous manner and reference is made to copending application Ser. No. 673,267 filed Oct. 6, 1967, in which Jean-Louis A. Benoit-Guyot and Andre Boucherle are inventors, now U.S. Pat. No. 3,555,091, issued Jan. 12, 1971, for purposes of illustrating the preparation of certain dialkylacetylanilides.

The following examples are presented in order to disclose the invention more fully. It should be understood, however, that they are not intended to limit the invention in any way.

EXAMPLE I

Preparation of dipropylacetylsalicylic acid 4.89 gm. of dipropylacetyl chloride (30 millimoles) are heated with 3.66 gm. of salicylic acid (30 millimoles) for two hours at reflux in pyridine (50 ml.) freshly distilled over potassium hydroxide. The precipitate that forms is separated. To the filtrate is aded 20 ml. of 5% HCl and is extracted twice with 50 ml. of ethyl ether. The ethereal phase is dried over sodium sulfate and evaporated.

The evaporation residue is purified by precipitation of the product in alcoholic solution by the addition of water. After three or four successive treatments a compound is obtained, the hydro-alcoholic solution of which no longer gives any coloration with ferric chloride.

According to the same method dipropylacetyl-2-naphthoic-3-acid and dipropylsalicylamide have been prepared.

EXAMPLE II

Preparation of dipropylacetyl-hydroxy-4-anilide 4.89 gm. of dipropylacetyl chloride (30 millimoles) are heated with 6.54 gm. of para aminophenol (60 millimoles) are heated with 6.54 gm. of para aminophenol (60 millimoles) in solution in 100 ml. anhydrous dioxane for one hour at reflux.

The reaction mixture is evaporated, then the residue is dissolved in 20 ml. of alcohol at 996°. The hot solution is filtered. The filtrate is cooled to 0°, then crushed ice is added very slowly until precipitation is complete.

This operation is repeated several times.

EXAMPLE III

Preparation of dipropylacetyl-trifluoromethyl-5-chloro-2-anilide 4.89 gm.. of dipropylacetyl chloride (30 millimoles) are put in contact with 11.76 gm. of chloro-2-trifluoromethyl-5-aniline (60 millimoles) at amibent temperature over a period of 10 minutes.

A precipitate is formed which is separated. The filtrate is washed by agitation with water in a separatory funnel until the aqueous phase no longer gives any turbidity with silver nitrate in nitric medium.

The aromatic phase is then dried and evaporated. The residue is purified by precipitation with water from its alcoholic solution.

Pharmacologic properties and therapeutic applications

The products, objects of the invention, have notably, analgestic, antipyretic and anti-inflammatory properties which most often are, in equal doses, superior to those of aspirin.

These properties are evidenced in particular by the following experiments:

EXAMPLE IV

Determination of analgesic activity (A) Method of determination used: Mice are placed on a metallic grill connected by an electrode to an apparatus permitting the sending of electric stimulations of known duration and intensity. With the second electrode the tail of the animal is gripped to establish the circuit of current through its body. The stimulator is controlled to send, across a relay of high frequency, a continuous current of a duration of 1.5 sec. and of variable intensity, controlled by an oscilloscope connected in parallel.

Lots of 10 mice are used. Each animal is tested separately. After having been placed on the grill under the conditions already described, a current of a weak intensity is transmitted by beginning with 10 volts, then by increasing in 5 volt increments until the mouse utters a small cry.

This test is repeated every ten minutes for one hour and, after having determined the average voltages at which the 10 animals, in each test, have uttered their cries, the curve of susceptibility of the animals is then drawn by putting the voltages on the abcissa and the times on the ordinates. For these control animals the average voltage thus obtained varies from 20 to 22 volts according to the lots of animals.

The following day, these standardized mice are treated by the oral route with the test product and the same procedures are repeated, at first every ten minutes then, if necessary, every ¼ hour or every ½ hour until the activity of the product stops, one falls back to the threshold voltage obtained the day before.

If the product possesses analgesic properties the animals endure currents of much stronger intensity than the untreated animals.

This test method, therefore, permits the determination, at the same time, of the rapidity of action of a product as well as the intensity and the duration of this activity.

(B) RESULTS
[At equal doses]

| Products | Latent period of induction after ingestion of product, min. | Maximum voltage endured without cry by the animals, volts | Time at the end of which the mice are returned to the threshold voltage, min. |
| --- | --- | --- | --- |
| Aspirin | 10 | 40 | 120 |
| B.34.65 | 0 | 60 | 300 |
| B.G.12P.F | 10 | 27 | 180 |
| B.G.11G.A | 60 | 34 | 200 |
| B.G.11G.B | 0 | 38 | 260 |
| B.G.11M.V | 0 | 32 | 180 |
| B.G.11J.E | 0 | 40 | 260 |
| B.G.11J.F | 0 | 35 | 240 |
| B.G.11J.G | 0 | 40 | 240 |
| B.G.11J.H | 0 | 53 | 440 |
| B.G.11J.I | 0 | 47 | 500 |
| B.G.12P.B | 0 | 36 | 240 |

It is seen that the main point of the analgesic action, measured by this test, of the products that are the objects of the invention is most often comparable and frequently superior to that of aspirin and that in every case the duration of this activity is greater than that of aspirin. Other tests have confirmed these results such as those of Randall and Seletto.

EXAMPLE V

Determination of the antipyretic activity (A) Method of determination utilized: The rabbit is used as a test animal, in which a hyperthermia is provoked by intraperitoneal injection of 10% aqueous suspension of brewer's yeast at the rate of 1 ml. of per kilo of weight. After the injection, the temperature of the animals is taken every ½ hour with the aid of a rectal thermocouple, and the average of the lot of animals in the experiment at each temperature reading is calculated. Lots of 4 rabbits are used and the products to be studied are administered in a dose of 165 mg./kg. by the oral route 1 hour 30 minutes after the injection of brewer's yeast.

(B) Results: Among the control animals, as with the treated animals, the maximum temperature is attained 5½ hours after the injection of the brewer's yeast. However, it is elevated in the controls by 2.1°, in the animals treated with aspirin by 1.9° and in those treated with B.34.65 by 1.2°. In addition, in the controls a thermal plateau is established beginning with this maximum point, and still persists 2½ hours before the start of the very slow drop towards normal temperature, since ten hours after the injection the hyperthermia is still 1.5°.

Among the animals treated with aspirin a slight drop of 0.2° is produced immediately, and at the tenth hour the treated rabbits are at the same level as the controls. Finally, in the animals treated with B.34.65 a large drop of 1° is produced immediately, and in ten hours the animals are practically back to their starting temperature since the hyperthermia is no more than 0.15°.

EXAMPLE V

Determination of the anti-inflammatory action (A) Method of determination used: The determination is effected on groups of 10 mice. Subcutaneous injections of 0.05 ml. of a 4% formaldehyde solution are made in the dorsal part of the right rear paw of each animal. In the same manner, and in order to have a control, the same volume of physiological solution is injected in the left rear paw. Each animal then receives 0.1 ml. of a 0.5% solution of Evans blue in physiological solution in the caudal vein.

At the end of one hour the animals are examined and first of all the difference in coloration between the right and left paws is noted, the coloration being more accentuated in the inflamed paws.

The notation 0 corresponds to no difference when compared with the control paw. The notation + corresponds to a slightly perceptible difference. The notation ++ to a distinct difference. The notation +++ to a very large difference.

The animals are then sacrificed. The paws are cut at the level of articulation of the knee and all the right paws are combined and all the left paws are combined. The difference in weight between the average of right paws and the average of left paws determines the weight of the edema.

The treated animals receive, three hours before the test and ½ hour after the injection of formaldehyde, aspirin or the product to be tested, by the oral route in suspension in gum.

(B) Results: The results obtained are summarized in the following table:

| Products studied | Coloration: total number of + for 10 mice | Average weight of edema per mouse, mg. | Percent of inflammation compared to controls |
| --- | --- | --- | --- |
| Control | 17 | 33 | 100 |
| Aspirin, 200 mg./kg.×2 | 10 | 31.1 | 91.2 |
| Phenylbutazone, 50 mg./kg. ×2 | 20 | 20.7 | 62.7 |
| B.34.65, 200 mg./kg.×2 | 11 | 22.6 | 68.4 |
| B.34.65, 100 mg./kg.×2 | 8 | 24 | 72.7 |
| B.34.65, 50 mg./kg.×2 | 11 | 33 | 100 |
| B.G.11J.H., 200 mg./kg.×2 | 8 | 21.2 | 64.2 |

Thus, B.34.65 shows a clearly superior anti-inflammatory action considering weight of edema to that of aspirin in the same dosage. It is extremely interesting to note that half a dose of B.34.65 has produced quite comparable results. On the other hand, no notable action on the weight of edema exists at 50 mg./kg. which permits the implication that the action of B.34.65 is governed by a threshold phenomenon. B.G.11J.H. has shown, for its part, a significantly identical activity to that of B.34.65.

EXAMPLE VI

Toxicity

Different methods of test have been applied and have shown that the lethal dose of the products which are the object of the invention is, in all cases, higher than that of aspirin. In fact $LD_{50}$ of aspirin is 1.5 gm./kg. and the products that are the objects of the invention are always higher than 2.5 gm./kg.

Clinical tests

By way of example, the results of several clinical tests of B.34.65 (dipropylacetylsalicylic acid) will be given.

EXAMPLE VII (I) Mrs. M. B., 33 years of age, suffers from frontal headaches on awakening. A dose of 500 mg. of product begins to act at the end of 15 minutes. The pains go away and do not return during the day. No intolerance and no secondary manifestation.

(II) Mrs. J. B., 42 years of age, suffers from influenza with rhinitis and fronto-occipital apyretic headache. It is a question of nervous illness. A dose of 500 mg. of product is administered. The headache disappears 15 minutes after the dose is taken and minifests itself again only after two hours. A new dose administered after the return of pain is successful in aleviating the pain. No intolerance or secondary manifestation.

(III) Mr. S. B., 42 years of age, suffers from alveo-dental arthritis. Pain involving the upper and lower right maxillaries. Mastication impossble. A dose of 500 mg. of product, at the end of 15 minutes, suppresses the painful paroxyms and the abnormal sensitivity to the pressure of the maxillaries. There is, however, persistence of tenderness. No intolerance or secondary reaction.

By way of further example, the results of several clinical tests concerning B.G.11J.I. (dipropylacetyl-bis-trifluoromethyl-3-5-anilide) follow:

EXAMPLE VIII (I) Mrs. J. B., 52 years old, suffers from frequent frontal headaches during the day. A dose of 250 mg. of product acts at the end of several minutes and the pains do not return all day. Excellent tolerance.

(II) Miss E. G., 26 years of age, suffers from a violent fronto-occipital headache due, without doubt, to apyretic influenza. Two doses of 250 mg. relieve the pain in 10 minutes. At the end of three hours it begins to return, two doses are administered again. The pain disappears completely and does not return. No secondary manifestation, very good tolerance.

As additional examples, the results of several clinical tests concerning B.G.11J.H. (dipropylacetyl-trifluoromethyl-5-chloro-2-anilide) follow:

EXAMPLE IX

Mr. A. C., 46 years of age, suffers from chronic inflammation of the right knee resulting from an old injury. Walks with great difficulty. A dose of 250 mg. diminishes the pain of walking markedly at the end of 15 minutes. The pain returns four hours later, a second dose effects a new sedation. No secondary manifestations, very good tolerance.

Mrs. B. S., 32 years of age, suffers from tendinite of the left elbow, following a recent fracture of the humerus. A treatment of four doses per day for eight days permits the suppression of the pain while the malady is being healed. No secondary manifestations, no intolerance.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

We claim:

1. A method of inducing analgesia in warm-blooded animals in need of said inducement, comprising administering to said animals in an amount sufficient to induce said analgesia, a compound of the formula

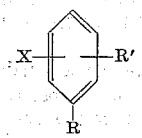

wherein R is dipropylacetylamino, R' is selected from the group consisting of hydroxy, lower alkoxy, halomethyl and acetamido and X is selected from the group consisting of hydrogen and halogen.

2. The method defined by claim 1 wherein R is dipropylacetylamino.

3. The method defined by claim 2 wherein R' is halomethyl.

4. The method defined by claim 3 wherein R' is trifluoromethyl.

5. The method defined by claim 4 wherein X is chlorine.

6. The method defined by claim 4 wherein X is hydrogen.

7. The method defined by claim 2 wherein R' is lower alkoxy.

8. The method defined by claim 7 wherein R' is ethoxy.

9. The method defined by claim 8 wherein X is hydrogen.

10. The method defined by claim 2 wherein R' is hydroxy.

References Cited

Benoit-Guyod et al., Memores Presents a la Societe Chimique, pp. 1660–1661 (1965), No. 245.

JEROME D. GOLDBERG, Primary Examiner

U.S. Cl. X.R.

424—230, 311